United States Patent
Schmidt et al.

(10) Patent No.: US 7,883,682 B2
(45) Date of Patent: Feb. 8, 2011

(54) CARBON DIOXIDE RICH OFF-GAS FROM A TWO STAGE GASIFICATION PROCESS

(75) Inventors: Roland Schmidt, Bartlesville, OK (US); Robert W. Morton, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 241 days.

(21) Appl. No.: 12/389,899

(22) Filed: Feb. 20, 2009

(65) Prior Publication Data

US 2010/0215565 A1 Aug. 26, 2010

(51) Int. Cl.
*C01B 31/20* (2006.01)

(52) U.S. Cl. ............... 423/437.1; 48/202; 48/DIG. 7

(58) Field of Classification Search .......... 423/437.1; 48/202, DIG. 7
See application file for complete search history.

(56) References Cited

U.S. PATENT DOCUMENTS

| 4,872,886 | A | 10/1989 | Henley et al. |
| 6,027,540 | A | 2/2000 | Smith et al. |
| 6,113,869 | A | 9/2000 | Jain et al. |
| 2004/0109801 | A1 | 6/2004 | Otsuka et al. |
| 2004/0123736 | A1 | 7/2004 | Torres, Jr. et al. |
| 2005/0247196 | A1 | 11/2005 | Benesch et al. |
| 2009/0038222 | A1 | 2/2009 | Douglas et al. |

FOREIGN PATENT DOCUMENTS

| EP | 0050863 | 5/1982 |
| EP | 0225146 | 6/1987 |
| EP | 0423401 | 4/1991 |
| GB | 1558996 | 1/1980 |
| JP | 58194986 | 11/1983 |
| WO | 2009020809 | 2/2009 |

OTHER PUBLICATIONS

PCT/US2010/023178 International Search Report (Form PCT/ISA/220) dated Nov. 11, 2010.

*Primary Examiner*—Stuart Hendrickson

(57) ABSTRACT

A process for gasification is provided for a non-catalytic, two-stage gasification process for gasification of a carbonaceous material. The reactor system generally comprises combustion in a first reaction zone and combustion in a second reaction zone.

10 Claims, No Drawings

US 7,883,682 B2

CARBON DIOXIDE RICH OFF-GAS FROM A TWO STAGE GASIFICATION PROCESS

BACKGROUND OF THE INVENTION

1. Field of the Invention

This invention relates to the gasification of carbonaceous materials. More particularly, the invention relates to the conversion of a solid carbonaceous fuel into gaseous products having increased fuel valued and ease of capture of carbon dioxide by-products.

2. Description of the Prior Art

Gasification has been used since the early 1800's to produce town gas from coal. Town gas was the most important gaseous fuel during the early industrial revolution and was used mainly for lighting, heating, and cooking. Starting around 1900, gasification was used to produce fuel with equal parts of hydrogen and carbon monoxide. Now, gasification processes can convert coal or coke into syngas, which can be used to produce electricity in an integrated gasification combined cycle (IGCC) process or as a starting point in many chemical processes.

Gasification reactors can convert generally solid feedstocks into gaseous products. For example, gasification reactors can gasify carbonaceous feedstocks, such as coal and/or petroleum coke, to produce desirable gaseous products such as hydrogen. Gasification reactors must be constructed to withstand the significant pressures and temperatures required to gasify solid feedstocks.

Generally, carbon in the coal or coke can be converted into gas by partial combustion with oxygen, according to the following equations.

$$C + O_2 \rightarrow CO_2 \text{ and } C + \tfrac{1}{2}O_2 \rightarrow CO$$

Carbon also can react with water in an endothermic water gas reaction.

$$C + H_2O \rightarrow CO + H_2$$

The shift reaction can convert all or part of the carbon monoxide into hydrogen to reach equilibrium.

$$CO + H_2O \leftrightarrow CO_2 + H_2$$

The final mixture which comprises hydrogen and carbon monoxide is called syngas.

In some applications, gasification can occur in the presence of air, which contains nitrogen, and gasification reactors can create by-products that need to be treated or disposed of due to environmental concerns. Thus, during the combustion process, carbon dioxide and nitrogen-containing compounds, such as oxides of nitrogen and amines, can be formed. Environmental regulations more frequently require the collection and sequestration of carbon dioxide. Amine separator units which are necessary to remove acidic compounds, such as, for example, $H_2S$ and $CO_2$, are very energy intensive, are large and thus have a massive footprint, and can be very costly to operate and maintain.

Some gasification processes can use only one oxy-fired reactor, but incomplete combustion results in an inefficient process with sub-standard energy and/or product output.

SUMMARY OF THE INVENTION

In one embodiment of the present invention, there is provided a two-stage, oxy-fired, non-catalytic gasification process for gasification of carbonaceous materials. The reactor system generally comprises oxy-firing in a first reaction zone and oxy-firing in a second reaction zone. The gasification process comprises the steps of (a) combusting in a first reaction zone a stream comprising an oxygen-containing gas and a first feedstock comprising of a slurry of particulate carbonaceous material in a liquid carrier at a temperature of between 2400° F. (1316° C.) and 3000° F. (1649° C.) and at a pressure of from 50 psig (345 kPa gage) to 600 psig (4137 kPa gage), thereby evolving heat and forming a first reaction product comprising liquid, molten slag and a gaseous products stream and entrained byproduct sticky, molten slag particles; (b) separating out and removing said liquid and molten slag; (c) combusting, in a second reaction zone a stream comprising an oxygen-containing gas, and a second feedstock comprising that portion of said first reaction product which comprises said gaseous products stream and said entrained byproduct sticky, molten slag particles and a second increment of a slurry of particulate carbonaceous material in a liquid carrier, at a temperature of between 2400° F. (1316° C.) and 3000° F. (1649° C.) and at a pressure of from 50 psig (345 kPa gage) to 600 psig (4137 kPa gage), thereby evolving heat and forming a second reaction product comprising liquid, molten slag and a gaseous products stream and entrained byproduct sticky, molten slag particles, and a stream of predominately carbon dioxide; (d) recovering a second portion of the heat from said gaseous products stream of the second reaction product in a high temperature heat recovery system, including a fire-tube boiler, whereby the gaseous products are cooled to a temperature of about 450° F. to about 550° F. (232° C. to 288.7° C.); and (e) recovering said stream of predominately carbon dioxide.

The second reaction zone can promote additional combustion which does not occur in the first reactor. The second feedstock can be injected into the second reaction zone by any means known in the art to provide a good reaction. Thus, both the fired reaction zone one and the fired reaction zone two reactor are primarily combustion reactors.

DETAILED DESCRIPTION

The present invention provides a two-stage, oxy-fired, non-catalytic gasification process for gasification of carbonaceous materials. The reactor system generally comprises oxy-firing in a first reaction zone and oxy-firing in a second reaction zone. As used herein, the term "oxy-firing" denotes combustion in the presence of greater than about 80 volume percent oxygen, as $O_2$, preferably greater than about 90 volume percent oxygen, and most preferably greater than 95 volume percent oxygen. Even though such a two-stage, oxy-fired, non-catalytic gasification process for gasification of carbonaceous materials can require additional oxygen feed, it is believed that the equipment necessary to produce any needed additional oxygen will be far more cost effective and more easily operated and maintained that any type of amine separation unit.

The first feedstock for and into the first reaction zone can comprise coal and/or petroleum coke. The first feedstock can further comprise water and other fluids to generate a coal and/or petroleum coke slurry for more ready flow and combustion. When the first feedstock comprises coal and/or petroleum coke, the first reaction product can comprise steam, char, and gaseous combustion products such as hydrogen, carbon monoxide, and carbon dioxide. The first reaction product also can comprise slag, as discussed in more detail below.

The first reaction product can be separated into an overhead portion and underflow portion. For example, where the first reaction product comprises steam, char, and gaseous combustion products, the overhead portion of the first reaction product can comprise steam and the gaseous combustion products while the underflow portion of the first reaction product can comprise slag. "Slag," as used herein, refers to mineral matter from the first feedstock along with any added residual fluxing agent, if any, that can remain after gasification reactions that occur within the first reaction zone and/or second reaction zone. The overhead portion of the first reaction product can be introduced into the second reaction zone.

The second feedstock for and introduced into the second reaction zone can comprise the overhead portion of the first reaction product. The second feedstock can further comprise additional coal and/or petroleum coke, water and other fluids to generate a coal and/or petroleum coke slurry for more ready flow and combustion. The second feedstock also can further comprise carbon dioxide which has been recovered and recycled after exiting the second stage reaction zone. Optionally, the recovered and recycled carbon dioxide can be cooled to assist in temperature control of the second reaction zone.

The second reaction product can similarly comprise steam, char, and gaseous combustion products such as hydrogen, carbon monoxide, and carbon dioxide when the first feedstock comprises coal and/or petroleum coke. The second reaction product also can comprise slag.

The gaseous off-gases of the second reaction product can comprise $CO_2$ and steam, which can easily be separated, if desired. If separated, the steam can be condensed and recycled back into reaction zone one, reaction zone two, or both reaction zones one and two. The fairly pure $CO_2$ stream can be sequestered, using any type of carbon capture sequestration (CCS) method known in the art, without the necessity of further purification. Thus, the need for one or more amine separator units to provide amine scrubbing of any off-gasses is no longer necessary with the use of oxy-firing.

The reaction of the first or second feedstocks in the corresponding reaction zone also can produce char. "Char," as used herein, refers to unburned carbon and ash particles that can remain entrained within the first reaction zone and/or second reaction zone after production of the various reaction products. The char produced by reaction of the first feedstock can be removed and recycled either back into the first reaction zone or directly into the second reaction zone to increase carbon conversion. For example, char can be recycled for injection into the first reaction zone as discussed above.

The combustion of the first feedstock within the first reaction zone can be carried out at any temperature suitable to generate the first reaction product from the first feedstock. For example, in embodiments where the first feedstock comprises coal and/or petroleum coke, the combustion of the first feedstock within the first reaction zone can be carried out at a maximum temperature of at least about 2,000° F., in the range of from about 2,200 to about 3,500° F., or 2,400 to 3,000° F.

The combustion of the second feedstock within the second reaction zone can be carried out at any temperature suitable to generate the second reaction product from the second feedstock. For example, in embodiments where the second feedstock comprises coal and/or petroleum coke, the combustion of the second feedstock within the second reaction zone can be carried out at a maximum temperature of at least about 2,000° F., in the range of from about 2,200 to about 3,500° F., or 2,400 to 3,000° F.

To facilitate reaction and generation of the reaction products, the first reaction zone and second reaction zone each can be maintained at a pressure of at least about 350 psig, and within a range of from about 350 to about 1,400 psig, or preferably, for ease of operation, within a range of 400 to 800 psig.

The second reaction product and any char entrained in the second reaction product can be separated in a cyclone separator. Char exiting the cyclone separator can be mixed with a liquid carrier forming a dilute slurry which thereafter can be concentrated in a settling tank to a solids concentration of from 10 to 30 percent by weight. Then from 5 to 20 percent of the concentrated, or recycle, char slurry, based on the total amount of solid carbon fuel to the first reaction zone, can be added back to the first feedstock for the first reaction zone, preferably after mixing with one or more streams of particulate carbonaceous solids comprising the first feedstock fed to the first reaction zone.

After exiting the cyclone, gaseous products can be transported into a high temperature heat recovery system. Any type of heat recovery system known in the art can be used. Exemplary types of heat recovery systems include, but are not limited radiant heat type boilers, water-tube boiler, fire-tube boilers, and combinations of two or more thereof. The operation can be augmented by the further addition of a steam superheater.

Theoretical Example

One theoretical embodiment of the present invention, a theoretical analysis that compared means of producing a sequesterable $CO_2$ stream from a power plant fueled by syngas from the gasification of 10,000 TPD of Illinois #6 Coal is provided. The comparison was made between combusting syngas in a conventional air-fired steam boiler (air-fired reactor) versus an oxy-fired steam boiler (oxy-fired reactor). In both cases, the boiler produced steam for powering turbines for the production an estimated 711 MWe of that assumed 38% conversion of thermal energy to electrical power.

In the case of the air-fired boiler, it was be necessary to pipe flue gas to an amine-based separator unit to produce a $CO_2$ stream of sequesterable quality. In the case of the oxy-fired boiler, the flue gas was composed of $CO_2$ along with some excess $O_2$ and no amine separation plant is needed. However, an air separation unit (ASU) would be required to produce oxygen for the oxy-firing process.

In addition to an ASU, the Oxy-firing option also required an oxygen scavenging process to treat the $CO_2$-rich flue gas to bring the $CO_2$-rich flue gas up to sequesterable quality unless a 10 ppmv (parts per million by volume) pipe line specification could be relaxed. In oxy-firing, the minimum $O_2$ content in the $CO_2$ stream was likely to be 2.0%. In this case where 10,000 tins per day (TPD) of coal was processed, 2% excess $O_2$ is equivalent to 413 TPD of oxygen, which was considered a significant amount.

The economic assumptions included that the boiler operation and power production were identical in both cases. The quench operations were identical in both cases. The air-fired reactor required a conventionally designed amine separation unit, which was not required for the oxy-fired. The oxy-fired reactor required the following pieces of equipment, which were not required for the air-fired reactor: a) approximately four 3400 TPD air separation units, b) a $CO_2$ blower, and c) an $O_2$ scavenger unit. The air-fired case using amine separation unit was assumed to capture 90% of $CO_2$, whereas the oxy-fired case, which did not use an amine separation unit, was assumed to capture 100% of $CO_2$. Operating expenses for the oxy-fired reactor were pro-rated, based on the operating expenses of the air-fired reactor.

Exclusive of the $O_2$ scavenger unit for the oxy-fired reactor and given the assumptions made above, an oxy-fired reactor looked favorable compared to and air-fired reactor. Capital expenses (CAPEX) for an oxy-fired reactor were slightly less than those for an air-fired reactor, but operational expenses (OPEX) for an oxy-fired reactor were significantly less than those for an air-fired reactor, due to steam usage associated with amine regeneration. Comparison of CAPEX and OPEX wherein an $O_2$ scavenger unit was used with an oxy-fired reactor, showed a breakeven economic analysis. However, if credit was taken for a reduced amount of $CO_2$ generated using an oxy-fired reactor; the oxy-fired reactor was even more economically advantageous.

Based on this theoretical example, Oxy-firing of a steam boiler reactor can be potentially favorable to conventional air-firing for a 711 MW power plant fueled by syngas produced by the gasification of 10,000 TPD of coal. Excluding the issue of scavenging excess oxygen from the $CO_2$ stream, CAPEX and OPEX for the oxy-fired reactor were lower than those for the air-fired reactor.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

DEFINITIONS

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

CLAIMS NOT LIMITED TO THE DISCLOSED EMBODIMENTS

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

That which is claimed is:

1. A non-catalytic two-stage process for gasification of a carbonaceous material, which process comprises the steps of:
    (a) combusting in a first reaction zone a stream comprising an oxygen-containing gas and a first feedstock comprising of a slurry of particulate carbonaceous material in a liquid carrier at a temperature of between 2400° F. (1316° C.) and 3000° F. (1649° C.) and at a pressure of from 50 psig (345 kPa gage) to 600 psig (4137 kPa gage), thereby evolving heat and forming a first reaction product comprising liquid, molten slag and a gaseous products stream and entrained byproduct sticky, molten slag particles;
    (b) separating out and removing said liquid and molten slag;
    (c) combusting, in a second reaction zone a stream comprising an oxygen-containing gas, and a second feedstock comprising that portion of said first reaction product which comprises said gaseous products stream and said entrained byproduct sticky, molten slag particles and a second increment of a slurry of particulate carbonaceous material in a liquid carrier, at a temperature of between 2400° F. (1316° C.) and 3000° F. (1649° C.) and at a pressure of from 50 psig (345 kPa gage) to 600 psig (4137 kPa gage), thereby evolving heat and forming a second reaction product comprising liquid, molten slag and a gaseous products stream and entrained byproduct sticky, molten slag particles, and a stream of predominately carbon dioxide;
    (d) recovering a second portion of the heat from said gaseous products stream of the second reaction product in a high temperature heat recovery system, including a firetube boiler, whereby the gaseous products are cooled to a temperature of about 450° F. to about 550° F. (232° C. to 288.7° C.); and
    (e) recovering said stream of predominately carbon dioxide.

2. The process of claim 1 wherein the carrier liquid is water.

3. The process of claim 1 wherein said slurry of said steps (a) and (c) have a solids concentration from 30 to 70 percent by weight.

4. The process of claim 1 wherein the oxygen-containing gas selected from the group consisting of oxygen, oxygen-enriched air, and mixtures thereof.

5. The process of claim 1 wherein the oxygen-containing gas is oxygen-enriched air and the initial atomic ratio of free elemental oxygen to carbon in the reactor is between 1.5:1 and 2.5:1.

6. The process of claim 5 in which the solids content is from about 45 to about 55 percent by weight in both step (a) and step (b).

7. The process of claim 1 wherein said carbonaceous material is coal or lignite.

8. The process of claim 1 wherein said second reaction zone is connected to the top of said first reaction zone.

9. The process of claim 1 wherein said stream of predominately carbon dioxide is cooled and recycled into the first reaction zone.

10. The process of claim 1 wherein said stream said stream of predominately carbon dioxide is sequestered.

* * * * *